No. 832,489. PATENTED OCT. 2, 1906.
DE WITT E. LEWIS.
EYEGLASSES.
APPLICATION FILED JUNE 21, 1905.

Witnesses
Frank B. Hoffman.
John F. Byrne.

Inventor
DeWitt E. Lewis
By Victor J. Evans
Attorney

UNITED STATES PATENT OFFICE.

DE WITT E. LEWIS, OF BENNINGTON, VERMONT.

EYEGLASSES.

No. 832,489.  Specification of Letters Patent.  Patented Oct. 2, 1906.

Application filed June 21, 1905. Serial No. 266,311.

*To all whom it may concern:*

Be it known that I, DE WITT E. LEWIS, a citizen of the United States, residing at Bennington, in the county of Bennington and State of Vermont, have invented new and useful Improvements in Eyeglasses, of which the following is a specification.

This invention relates to eyeglasses.

The objects of the invention are to improve and simplify the construction of such devices; furthermore, to increase their adjustability and to decrease the expense attending their manufacture.

With the foregoing and other objects in view, which will appear as the description proceeds, the invention resides in the combination and arrangement of parts and in the details of construction hereinafter described and claimed as a practical embodiment thereof.

Figure 1:
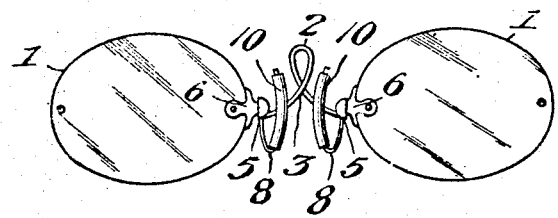
Figure 2:
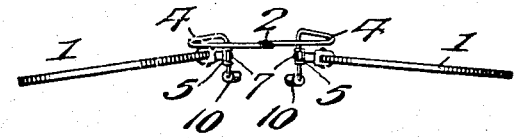
Figure 3:
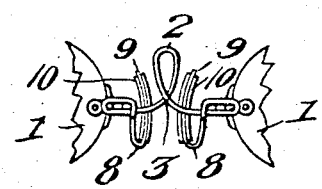

In the accompanying drawings, forming part of this specification, Figure 1 is a rear elevation of a pair of glasses constructed in accordance with the invention. Fig. 2 is a plan view thereof. Fig. 3 is a front elevation, the lenses being partly broken away.

Like reference-numerals indicate corresponding parts in the different figures of the drawings.

The reference-numerals 1 1 indicate the lenses, which may be of any suitable form and construction. The bridge which connects the lenses 1 1 is adapted to hold said lenses at an angle to each other, as indicated in Fig. 2. By reason of this construction the lenses never fall flat when the glasses are dropped, and the liability of breakage is therefore greatly decreased. It will be understood that the lenses are straightened out and held in alinement with each other when the glasses are placed in position upon the nose.

The bridge preferably is constructed of resilient material—such, for example, as wire. This resilient material is bent to form a loop 2, the lower ends of which are bent downwardly and outwardly in reverse directions and crossed over each other, as indicated at 3, after which the resilient material is bent laterally beyond the loop and formed to provide auxiliary loops 4. From the loops 4 the resilient material is bent upwardly and downwardly to form small attaching-loops 5, which are connected to the posts 6 by means of screws or other suitable devices 7. After forming the loops 5 the extreme ends of the resilient material are bent downward and rearward, as indicated at 8, and upward, as indicated at 9, the upwardly-extending ends 9 being adapted to receive suitable nose-guards 10, which are constructed of rubber or other suitable material, and are secured to the ends 9, as indicated clearly in Fig. 3. It will be observed that the loops 2 and 4 are disposed in front of the lenses and that the nose-guards 10 are disposed in rear thereof. By reason of this construction the loop 2 is prevented from touching against the forehead of the person wearing the glasses. The loops 2 and 4 serve to permit a large quantity of resilient material to be used in the construction of the bridge, so that the strength and adjustability thereof are greatly increased, it being understood that by means of a pair of tweezers the loops 2 and 4 may be made larger or smaller to accommodate noses of different size.

The improved eyeglasses of this invention are strong, simple, durable, and inexpensive in construction. They are adapted to various adjustments and can be readily made to fit any character of nose. By reason of the fact that the bridge is shaped in such manner as to hold the lenses at an angle to each other the liability of breakage is reduced to a minimum. By employing the crossed loop 2 the resiliency, strength, and adjustability of the bridge are increased to a marked degree. Furthermore, the loop 2 serves as a convenient means for suspending the glasses from a hook without permitting them to slide laterally.

It will be observed that the end 9 of the resilient material extends longitudinally from the end of the nose-guard 10. For this reason the portion 8 of the resilient material may be bent readily with a pair of tweezers or the like in order to adjust the nose-guard to any desired position.

Changes in the precise embodiment of invention illustrated and described may be made within the scope of the following claim without departing from the spirit of the invention or sacrificing any of its advantages.

Having thus described the invention, what is claimed is—

In an eyeglass, the combination with the lenses thereof, of a bridge formed from a single resilient member bent to provide a single loop having the ends thereof disposed downwardly and outwardly in reverse directions and crossed over each other, the ends of the member being then bent inwardly and formed to provide auxiliary loops, and thence bent upwardly and downwardly to form small attaching-loops, after which the ends are bent downward and rearward and upward, nose-guards secured to said upward-bent portions of the member, posts secured to the lenses, and means passing through the posts and engaging the small attaching-loops.

In testimony whereof I affix my signature in presence of two witnesses.

DE WITT E. LEWIS.

Witnesses:
 JOHN NASH,
 HARRY T. CUSHMAN.